June 18, 1963 G. E. MAIENKNECHT 3,094,141
PRESSURE REGULATING VALVE
Filed April 20, 1959
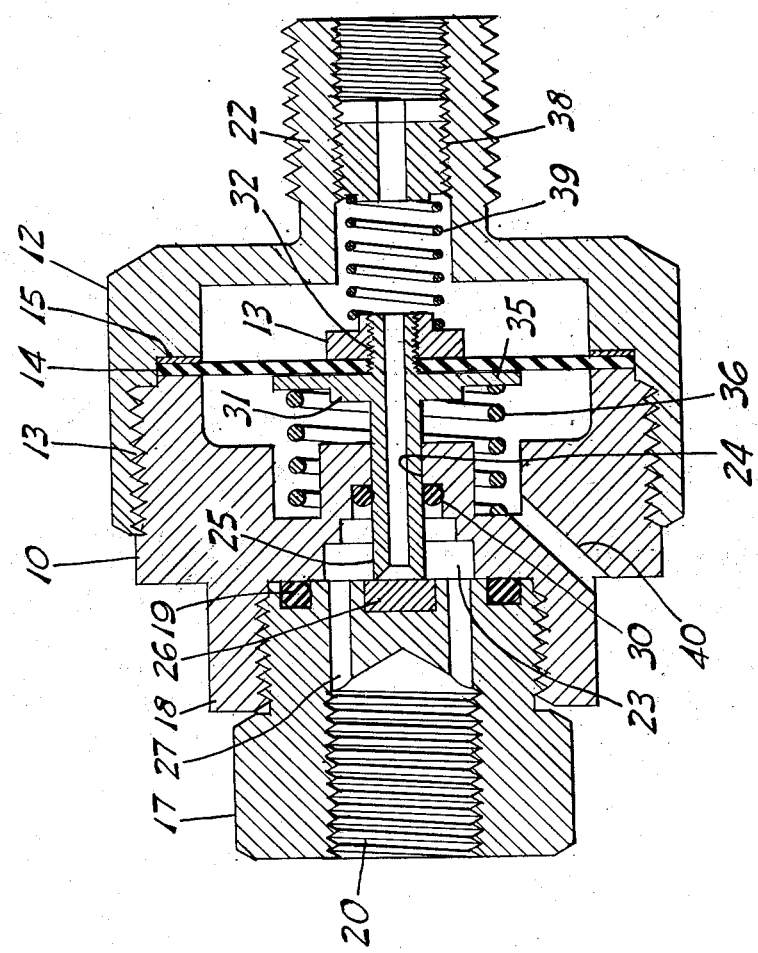
INVENTOR.
GAILE E. MAIENKNECHT
BY
Bean, Brooks, Buckley & Bean
ATTORNEYS.

3,094,141
PRESSURE REGULATING VALVE
Gaile E. Maienknecht, 364 Rensch Road,
Williamsville, N.Y.
Filed Apr. 20, 1959, Ser. No. 807,587
3 Claims. (Cl. 137—505.25)

This invention relates to regulating valves and particularly to a unitary valve device which may readily be inserted in a pressure conduit for accurately maintaining a predetermined fluid pressure at the outlet side thereof.

The valve of the present invention is simple and compact in construction and arrangement and is nevertheless rugged and foolproof and accordingly lends itself very advantageously to insertion in a fluid line whereby the valve may be carried by the line without unduly encumbering the same.

Construction of the valve of the present invention is further characterized by the simplicity of the pressure-sealing arrangement and the avoidance of any substantial pressure heads acting against packings or other movable joints. Only a single seal of relatively moving parts is employed and the pressures against this seal are substantially balanced so that the probability of fluid leakage is minimized.

A further important object of the present invention is realized in the provision of an arrangement whereby the minimum effective flow area through the valve comprises a bored opening of substantial length which may be precisely formed as to effective flow diameter. The valve arrangement is such that a small axial movement provides a valve passage area greater than the flow area of the bored opening of the valve. The narrow ranges of valve movement thus required permit the employment of spring biasing members having only slight movement between opening and closing positions, thus avoiding the usual troublesome variation in spring characteristics when the same are required to move and act through substantial ranges.

The valve controlling member of the valve of the present invention is under the influence of a pair of opposed coil springs of different force characteristics and the balanced differential spring bias thus provided provides for very accurate outlet pressure regulation. Means are provided for initially adjusting or setting the pressure gradient of the valve by adjusting the preloading of the springs but after such initial setting the valve of the present invention is capable of maintaining accurately regulated output pressure substantially indefinitely.

Other objects and advantages of the regulating valve construction of the present invention will appear to those skilled in the present art from a consideration of the form of regulating valve which is set forth herein in detail by way of example. Further advantages of the construction of the present invention are explained more fully at the end of the present specification following a description of the exemplary form.

While a single embodiment is illustrated in the drawing and described in detail in the following specification, it is to be understood that such form is by way of example only and that various mechanical modifications may be effected without departing from the principles of the invention, the spirit and scope of which is limited only as defined in the appended claims.

The single FIGURE of the drawing is a longitudinal cross-sectional view through one form of the regulating valve of the present invention.

In the form shown in the drawing by way of example a pair of cup-shaped body members 10 and 12 are provided with male and female threaded formations, respectively, as at 13, whereby the body members are assembled to form a generally cylindrical chamber. A diaphragm 14 is held securely at its marginal portions between cooperating annular surfaces of the body members 10 and 12 and with the cooperation of a gasket 15 provides a fluid type seal across the aforesaid cylindrical chamber.

A threaded end member 17 screws into an internally threaded end opening in body member 10 as at 18 and an O-ring packing 19 provides a fluid seal between body member 10 and end member 17. The outer end of end member 17 is provided with a tapped hole 20 for connection with the pressure source or the inlet side of a conduit. In the form of the invention shown in the drawing, body member 12 is provided with a threaded extension or nipple 22 for connection with a companion conduit which contains the fluid pressure which is to be regulated by the device of the present invention.

Axially inwardly of the end fitting 20 body member 12 is recessed to provide what may be called a valve chamber 23 and still further inwardly body member 10 is bored as at 24 to receive a tubular valve and conduit member 25 which is slidably mounted in the bore 24. The left-hand end of tubular member 25 comprises a valving face and cooperates with a nylon disc 26 which is inserted in the inner end face of end member 17.

A plurality of openings 27 extend axially from the tapped hole 20 to the chamber 23, the same being spaced about the valve disc 26 in a circular arrangement. An O-ring packing member 30 fits closely about tubular member 25 in an annular recess formed in body member 10 to provide a fluid seal between the valve chamber 23 and the space to the right of the packing member 25.

Tubular valve member 25 is provided with an annular enlargement 31 and a threaded end portion 32 which receives a nut 33. The threaded end portion 32 passes through a central opening in diaphragm 14 and the latter is clamped securely between the annular enlargement 31 and nut 33, thus hermetically sealing the spaces to the left and the right of the diaphragm 14 in the cylindrical chamber formed by the body members 10 and 12.

Annular enlargement 31 is provided with a further radial etxension 35 which forms a spring seat and a compression coil spring 36 is disposed between seat 35 and the interior of body member 10 to urge diaphragm 14 to the right as viewed in the drawing which, it will be noted, tends to urge tubular valve member 25 to an unseated position with respect to valve disc 26.

The nipple portion 22 of body member 12 is internally threaded to receive an annular adjusting screw or sleeve member 38 and a second compression coil spring of a generally lighter force, indicated at 39, is disposed between adjusting screw 38 and an annular seat formed on nut 33.

Thus the spring 39 partially counteracts the urge of the principal biasing spring 36 and the differential between the two represents the effective force urging diaphragm 14 to the right, as viewed in the drawing, against the urge of the fluid pressure against the right hand side of the diaphragm. The initial tension of the springs 36 and 39 may be jointly increased by screwing the adjusted screw 38 in or out with respect to nipple 22, thus varying the differential between the springs and accordingly determining the pressure regulating setting of the valve.

The space within the housing which lies to the left of diaphragm 14 is vented to the atmosphere as at 40. Accordingly, when the fluid pressure at the outlet side of the device as applied to the right-hand side of diaphragm 14 exceeds the effective opposing force of coil spring 36, as modified by opposing coil spring 39, the tubular valve member 25 will be urged to the left as viewed in the drawing and the left-hand end thereof will be in valve closing relationship with respect to valve disc 26.

Assuming an excess of fluid pressure is being applied through end member 17, whenever the outlet pressure falls below the regulated norm, diaphragm 14 will move to the right under the urge of coil spring 36, tubular valve member 25 will unseat, and fluid pressure will flow through the passages 27, the chamber 23, and through the bore in tubular valve member 25, to raise and maintain the outlet pressure to the prescribed level.

It will be noted that the supplied fluid pressure passes through a straight bore in tubular valve member 25 and a substantial continuation thereof in adjusting screw member 38, whereby there is a straight line flow from the valve seating parts to the outlet conduit and the straight bore of tubular valve member 25 provides an accurately controllable minimum flow area, that is, an area of greatest constriction which may be formed with great precision and which can be of very small bore and controlled within very close tolerances as desired.

It will further be noted that the left-hand valve seating end of tubular member 25 is internally beveled, in the present instance, so that the effective seating circle thereof is practically equal to the outside diameter of the tubular member at this point. Also, the seating of O-ring packing 30 against the outside diameter of tubular member 25 presents a sealing circle of the same diameter and thus pressure as between these two areas, that is the valving circle and the O-ring sealing circle, does not bias the tubular valve member 25 to any discernible degree in either direction.

Furthermore, the relatively small cross-sectional area of the bore in tubular valve 25 and the relatively larger diameter seating circle of the left-hand end of tubular valve member 25 results in a condition wherein only a relatively small axial movement of the valve member is required for full opening. This renders the valving arrangement very sensitive and quickly responsive and, because of the very short range of movement between closed and open positions, the degree of spring movement is correspondingly small and is therefore much more predictable and controllable. The variation in coil spring characteristics for different ranges of compression of a given spring is well known and generally unavoidable.

I claim:

1. In a pressure regulating valve, causing means forming a generally cylindrical chamber, a diaphragm extending across said chamber to divide the same into coaxial chamber portions comprising a vented chamber portion and an outlet pressure chamber portion, said casing means having an inlet pressure chamber portion at the vented chamber portion side of said diaphragm but spaced axially therefrom away from said diaphragm, said casing means having an axial inlet passage at the inlet pressure chamber side thereof in open fluid communication with said inlet pressure chamber, said casing means including an axial bearing formation separating said inlet pressure chamber portion and said vented chamber portion, a tubular member axially slidable in said bearing formation and fixed at one end to said diaphragm, the opposite end of said tubular member being disposed in said inlet pressure chamber portion and comprising an axially movable valve, a radial face in said inlet pressure chamber portion cooperating with said tubular member to form a valve between said inlet pressure chamber portion and said outlet pressure chamber portion by way of the interior of said tubular member wherein the effective valve diameter is substantially the same as the diameter of said valve in said bearing formation whereby pressure in said inlet pressure chamber imposes substantially no bias on said tubular valve member in an axial direction, a main compression coil spring in said vented chamber portion and acting against said diaphragm, a more yieldable compression coil spring of less force than said main spring in said outlet pressure chamber portion and having an end thereof acting against said diaphragm to partially counteract the bias of said main compression coil spring, and an axially adjustable annular spring seat within said outlet pressure chamber portion bearing against the other end of said more yieldable coil spring to vary the counteracting effect thereof with respect to said main compression coil spring and thus adjust the outlet pressure constant of said valve, said adjustable annular spring seat having an axial bore comprising an outlet pressure passage.

2. In a pressure regulating valve, casing means forming a generally cylindrical chamber, a diaphragm extending across said chamber to divide the same into coaxial chamber portions comprising a vented chamber portion and an outlet pressure chamber portion, said casing means having an inlet pressure chamber portion at the axially opposite side of said vented chamber portion from said diaphragm, said casing means having an axial inlet passage at the inlet pressure chamber side thereof in open fluid communication with said inlet pressure chamber, said casing means including wall means separating said inlet pressure chamber portion and said vented chamber portion, a tubular member axially slidable in said bearing formation and fixed at one end to said diaphragm, the opposite end of said tubular member being disposed in said inlet pressure chamber portion and comprising an axially movable valve, a radial face in said inlet pressure chamber portion cooperating with said tubular member to form a valve between said inlet pressure chamber portion and said outlet pressure chamber portion by way of the interior of said tubular member wherein the effective valve diameter is substantially the same as the diameter of said valve in said bearing formation whereby pressure in said inlet pressure chamber imposes substantially no bias on said tubular valve member in an axial direction, a main compression coil spring in said vented chamber portion and acting against said diaphragm, a more yieldable compression coil spring of less force than said main spring in said outlet pressure chamber portion and having an end thereof acting against said diaphragm to partially counteract the bias of said main compression coil spring, and an axially adjustable annular spring seat within said outlet pressure chamber portion bearing against the other end of said more yieldable coil spring to vary the counteracting effect thereof with respect to said main compression coil spring and thus adjust the outlet pressure constant of said valve, said adjustable annular spring seat having an axial bore comprising an outlet pressure passage.

3. In a pressure regulating valve, casing means forming a generally cylindrical chamber, a diaphragm extending across said chamber to divide the same into coaxial chamber portions comprising a vented chamber portion and an outlet pressure chamber portion, said casing means having an inlet pressure chamber portion at the vented chamber portion side of said diaphragm but spaced axially therefrom away from said diaphragm, said casing means having an axial inlet passage at the inlet pressure chamber side thereof in open fluid communication with said inlet pressure chamber, said casing means including an axial bearing formation separating said inlet pressure chamber portion and said vented chamber portion, a tubular member axially slidable in said bearing formation and fixed at one end to said diaphragm, the opposite end of said tubular member being disposed in said inlet pressure chamber portion and comprising an axially movable valve and the interior of said tubular member forming a direct axial conduit from said valve to said pressure chamber portion, a radial face in said inlet pressure chamber portion cooperating with said tubular member to form a valve between said inlet pressure chamber portion and said outlet pressure chamber portion by way of the interior of said tubular member wherein the effective valve diameter is substantially the same as the diameter of said valve in said bearing formation whereby pressure in said inlet pressure chamber imposes substantially no bias on said tubular valve member in an axial direction, a main compression coil spring in said vented chamber portion and acting against said diaphragm, a more yieldable compression coil spring of less force than said main spring in said outlet pressure chamber portion and having an end thereof acting against said diaphragm to partially counteract the bias of said main compression coil spring, and an axially adjustable annular spring seat within said outlet pressure chamber portion bearing against the other end of said more yieldable coil spring to vary the counteracting effect thereof with respect to said main compression coil spring and thus adjust the outlet pressure constant of said valve, said adjustable annular spring seat having an axial bore comprising an outlet pressure passage.

References Cited in the file of this patent

UNITED STATES PATENTS

| | | |
|---|---|---|
| 762,274 | Bourseau | Jan. 14, 1904 |
| 2,084,597 | Risser | June 22, 1937 |
| 2,731,975 | Boals | Jan. 24, 1956 |
| 2,753,887 | Meincke | July 10, 1956 |
| 2,855,950 | Phillips | Oct. 14, 1958 |
| 2,888,949 | Evans | Jan. 2, 1959 |
| 2,004,686 | McKee | Oct. 17, 1961 |